Jan. 23, 1951     C. A. ATWELL ET AL     2,539,173
POWER PLANT EXCITATION SYSTEM
Filed Nov. 20, 1947
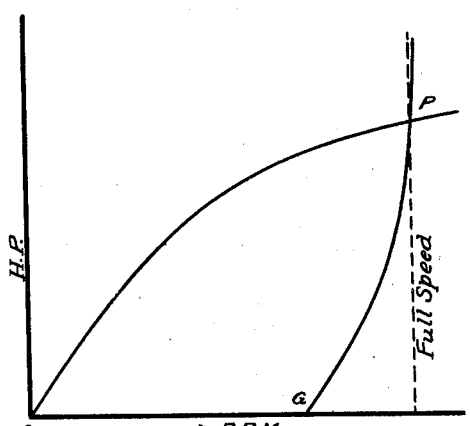
Fig. 1.
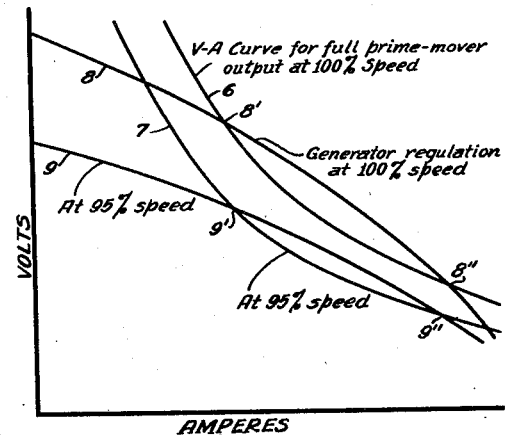
Fig. 2.
Fig. 3.
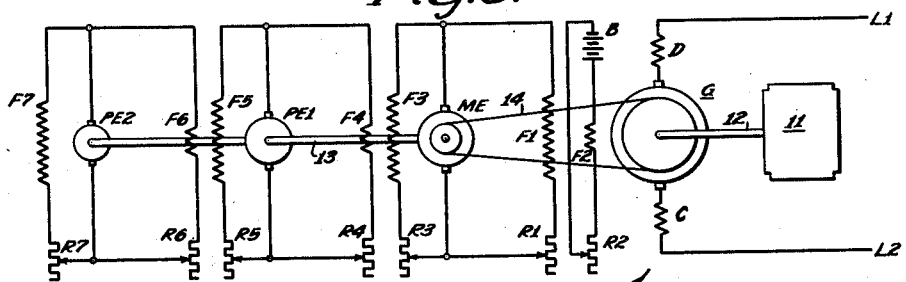
Fig. 4.
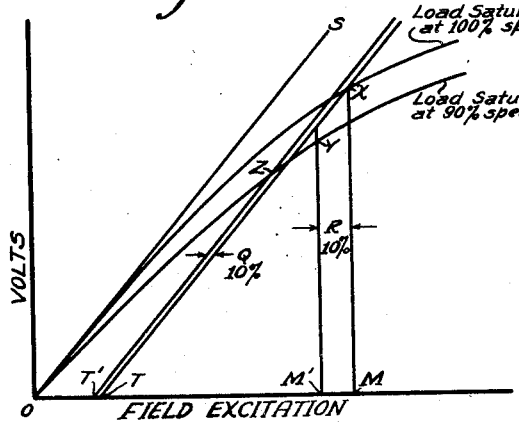
Fig. 5.
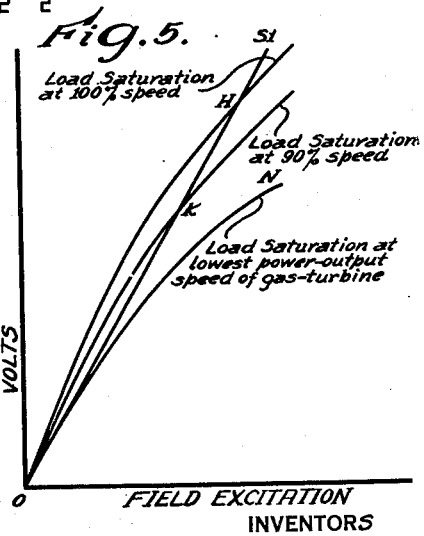
WITNESSES:
Robert C. Baird
Kw. C. Groome
INVENTORS
Clarence A. Atwell and
Charles F. Jenkins.
BY O. B. Buchanan
ATTORNEY Patented Jan. 23, 1951

2,539,173

UNITED STATES PATENT OFFICE 2,539,173

POWER-PLANT EXCITATION SYSTEM

Clarence A. Atwell, Pittsburgh, and Charles F. Jenkins, Laughlintown, Pa., assignors to Westinghouse Electric Corporation, East Pittsburgh, Pa., a corporation of Pennsylvania Application November 20, 1947, Serial No. 787,205

7 Claims. (Cl. 290—7)

Our invention relates to an excitation-system for a direct-current generator which is used for loading a gas turbine, as in a turbine-electric locomotive.

An object of our invention is to provide a power-plant employing a prime-mover, such as a gas turbine, which varies its power-output in proportion to about the sixth power of its speed, or at least faster than the fourth power of its speed, in combination with dynamo-electric generator-means which is mechanically coupled to said prime-mover and is adapted to absorb substantially all of the power of the prime-mover, and which is provided with an excitation-system which varies the exciting-voltage at a rate faster than the output-variation of the prime-mover, in response to speed-variations, so that the generator-means drops its load faster than the prime-mover output, when the speed of the prime-mover drops, thus avoiding stalling the prime-mover.

With the foregoing and other objects in view, our invention consists in the systems, circuits, combinations, machines, parts, and methods of operation, control, and manufacture, hereinafter described and claimed, and illustrated in the accompanying drawing, wherein:

Fig. 1 is an output-speed curve for a gas turbine in comparison with a Diesel or gasoline engine;

Fig. 2 is a set of volt-ampere curves illustrative of our invention;

Fig. 3 is a simplified symbolic diagram of circuits and apparatus illustrative of a preferred form of embodiment of our invention; and Figs. 4 and 5 are excitation-diagrams illustrative of our invention.

The art of exciting a direct-current generator so as to absorb the power-output of a Diesel or gasoline engine is well developed. When a gas turbine is used for the prime-mover, however, a different situation exists. This is shown in Fig. 1, wherein the curve OP represents a typical shape of the horse-power-speed curve (H. P.-R. P. M.) for a Diesel or gasoline engine, whereas the curve GP represents a typical shape of the H. P.-R. P. M. curve for a gas turbine. It will be noted that the output-curve OP, for a Diesel or gasoline engine, starts at the origin, and swings up, with increasing speeds, until it is fairly flat in the full-speed range of the engine. In the case of a gas turbine, however, no power-output is produced until the turbine reaches a certain speed G, and from that speed up to the full operating speed, the change in the power-output is very rapid, being approximately as the sixth power of the speed, in the operating range of the turbine.

The significance of this speed-sensitive power-change, in relation to the volt-ampere requirements of an electric generator which constitutes practically the sole load on the turbine, is illustrated in Fig. 2, wherein the curve 6 shows the volt-ampere curve for an ideal generator which is developing a constant output, as its current and voltage change, keeping this constant output at the power-output of the gas turbine when it is operating at 100% speed. Assuming that the turbine-output varies exactly as the sixth power of its speed, then at 95% speed the power-output of the turbine will be reduced to 73.5% of its full output which is shown in curve 6, this reduced output being indicated by the curve 7 in Fig. 2.

A generator which loads a gas turbine, therefore, must be controlled so as to be very sensitive to speed-changes, so that, when the generator is subjected to an overload, or to a demand for more power, it will not deliver that overload, but on the contrary, will drop its load, as its speed falls off, more rapidly than the turbine drops its power-output, in response to a falling off of speed. Otherwise, the generator would stall the prime-mover or gas turbine, whenever there was a momentary increased-load demand on the generator.

In accordance with our present invention, assuming a sixth-power speed-response in the turbine-output, the generator-voltage, at any given number of load-amperes, will be reduced at a rate better than the sixth power of speed, say the six and one-half power of speed. If such a speed-sensitive voltage-control is used on the generator, it is not particularly essential that the generator have a volt-ampere characteristic which approximates the shape of the constant-power curves 6 and 7 in Fig. 2, as the system will operate whether this characteristic volt-ampere shape is closely approached or not, provided that the volt-ampere characteristic of the generator is a drooping characteristic. A typical volt-ampere characteristic, showing the generator-regulation at 100% speed, is indicated by the curve 8 in Fig. 2. It will be noted that this curve 8 crosses the turbine-output curve 6 at two points 8' and 8", so that a generator, with such a characteristic, will have a stable operating-condition as indicated by the upper point 8', when absorbing the power of a prime-mover which is represented by the volt-ampere curve 6.

If, now, the generator-voltage can be made so sensitive to the speed of the generator that it varies as, say, the six and one-half power of the speed, a drop in speed, to a value equal to 95% of its full speed, will cause the generator-voltage to drop to 71.6% of its former value, at each value of the load-current of the generator, as indicated by the curve 9 in Fig. 2. It will be noted that this new generator-characteristic curve 9 intercepts the corresponding turbine-output curve 7 at two points 9' and 9'', so that the generator will have a stable operating-condition at the upper intersection 9', which was seen to correspond to a slightly increased ampere-load on the generator, and a very much decreased output-voltage.

The turbine-generator combination is thus seen to be stable, inasmuch as the generator can not stall the turbine, and the generator will adjust its output-voltage and load-current so as to absorb the power delivered by the turbine under under all operating conditions. This power can be regulated by a suitable throttle-control on the gas turbine. Such a power-plant system is thus seen to be admirably suited for the requirements of a power-plant for an electric locomotive having traction-motors energized from such a generator.

In Fig. 3, a gas turbine is symbolically indicated, at 11, as having a shaft 12 which is direct-connected to a generator G which is illustrated as having an armature-circuit connected to the output-leads L1 and L2, and serially including a differential series field-winding D, and a commutating-winding C. The field-member of the generator G is also provided with a main field-winding F1 and a smaller auxiliary field-winding F2, nearly all of the field of the generator being supplied by the winding F1.

The field-excitation system which is shown in Fig. 3 comprises a main exciter ME and two pilot-exciters PE1 and PE2, all three exciters being mounted on a common shaft 13 which is driven at any convenient speed, proportional to the speed of the prime-mover or gas turbine 11, as by means of a pulley-drive 14 from the turbine-shaft 12.

Each of the exciters ME, PE1, and PE2 is a direct-current generator or dynamo-electric machine which has an output-voltage which varies according to a certain power of the speed. The main exciter ME has a principal field-winding F3 which supplies most of the field of the exciter, and an auxiliary field-winding F4. The armature-circuit of the main exciter ME is used to energize the main field-winding F1 of the generator G. The main field-winding F3 of the main exciter ME is self-excited from the armature circuit of the main exciter, as shown in Fig. 3. By the term "self-excited," we mean to refer to a condition in which the field-exciting ampere-turns of a direct-current generator are obtained from a field-winding which is connected in shunt across the armature circuit of that generator, as shown for the main field-winding F3 of the main exciter ME in Fig. 3.

Except for its size, the first pilot-exciter PE1 is similar to the main exciter ME. This first pilot-exciter has a self-excited main field-winding F5 and a separately excited auxiliary field-winding F6, and the armature-circuit of this first pilot-exciter PE1 energizes the auxiliary winding F4 of the main exciter ME.

The second pilot-exciter PE2 has a self-excited field-winding F7, and its armature-circuit is used to energize the auxiliary field-winding F6 of the first pilot-exciter PE1.

All seven of the field-windings F1 to F7 of the excitation-system shown in Fig. 3 are provided with serially connected, adjustable, field-rheostats R1 to R7, respectively, whereby the field-strengths may be adjusted as needed.

The auxiliary field-winding F2 of the generator G is adjustably energized, through its rheostat R2, from a constant-voltage source which is represented by a battery B, so that the voltage-level of the volt-ampere characteristic curve of the generator G, such as the curve 8 shown in Fig. 2, can be raised or lowered to control the operating-point 8' (Fig. 2) at which the generator operates, at any speed of the prime-mover or gas turbine 11.

It will be noted that the exciters ME and PE1 are mainly self-excited, but each exciter obtains a small portion of its excitation from another exciter, the voltage of which is sensitive to the speed of the exciter-shaft 13, and hence to the speed of the turbine-shaft 12. The reason for this combination of self-excitation and speed-responsive separate excitation is to obtain a much greater voltage-variation, in response to speed, than would be possible without the self-excitation. This is explained in Fig. 4, wherein the curve OX is the full-speed load-saturation curve of either one of the exciters ME or PE1, and OY is the load-saturation curve at 90% speed. If the total field-excitation of the exciter, at full speed, is shown by the distance OM, the excitation-line MX determines the operating-voltage X at full speed. If this excitation OM were entirely produced by means of a separate-excitation source which varies its voltage in exact proportion to the speed, then a 10% speed-reduction would result in a 10% excitation-reduction R, bringing the excitation-line down to M'Y, thus determining the operating voltage Y on the load-saturation curve OY at 90% speed.

Now, let us consider the case in which the exciter of Fig. 4 has most of its field-excitation, under operating conditions, supplied by self-excitation, with a full-speed excitation-line such as is represented by the straight line TX. Then the excitation OT will represent the part of the total excitation OM which is supplied by the separate excitation, and the excitation TM will represent the part of the total excitation which is supplied by self-excitation. If, now, the separate-excitation part OT is reduced 10%, as indicated at Q, corresponding to a 10% speed-reduction, on the assumption of a separate-excitation source which varies its voltage directly as the speed, then an excitation-line T'Z is obtained, substantially parallel to TX, and intersecting the load-saturation curve OY at Z, for the 90% speed-condition, thus determining the output-voltage Z of the exciter. It will be noted that a 10% speed-reduction at first resulted in changing the exciter-voltage from X to Y, assuming that all of the field is produced by separate excitation, whereas, in the case of an exciter having a partial self-excitation, a 10% speed-reduction results in a larger voltage-drop, from X to Z, which is larger than the voltage-drop from X to Y.

The final exciter, PE2, is made entirely self-excited, because it is the last one in the series, and does not receive excitation from a preceding exciter. This exciter should have a steep saturation-curve, as indicated at OH, in Fig. 5, for the 100% speed, so as to produce a rapid voltage-drop in response to speed. By properly setting the external field-resistor R7 of this exciter, the self-excitation line OS1 can be set, as shown in Fig. 5, so that it is approximately tangent to the beginning of the load-saturation curve ON at the lowest power-output speed OG (Fig. 1) of the gas turbine, or the speed at which the gas turbine starts to produce power. The system would then not build up any voltage below this turbine-speed OG (Fig. 1), and therefore would not absorb any electrical power below this speed. At 90% of full speed, the load-saturation curve OK, in Fig. 5, determines the exciter-voltage K at the intersection with the self-excitation line OS1.

The second pilot exciter PE2 can be built, in accordance with the principles just described, so as to have a terminal-voltage which varies as much as the one and one-half power of its speed, with any given setting of its field-rheostat R7. Each of the other two exciters PE1 and ME can be built, in accordance with the described principles of design, so as to have a terminal-voltage which varies as much as the square of the speed. The voltage of the generator G varies practically in proportion to its speed, for any given strength of its field-excitation. Hence, the voltage-variation of the generator, with the above-described excitation-system, is in accordance with about the six and one-half power (1½+2+2+1) of the speed, so that the generator G drops its voltage, and hence its load, faster than the gas turbine drops its power-output, in response to a drop in speed.

The differential field D of the generator is not essential, as it is merely a means for augmenting the effect of armature-reaction in controlling the droop of the volt-ampere characteristic of the generator, in a known manner.

While we have illustrated our invention in a single preferred form of embodiment, in which a single generator G is utilized to absorb all of the power of the prime-mover 11, and in which three dynamo-electric exciter-machines are used, we wish it to be understood that these precise details are not essential, as various changes may be made in regard to the number of machines used, or the substitution of one machine for another, or the substitution of other equivalents, and also various equipments may be added to or subtracted from the illustrated embodiment without departing from the essential principles of our invention. We desire, therefore, that the appended claims shall be accorded the broadest construction consistent with their language.

We claim as our invention:

1. A power-plant comprising a prime-mover of a type having a power-output which varies faster than the fourth power of its speed, dynamo-electric generator-means mechanically coupled to said prime-mover and adapted to absorb substantially all of the power of said prime-mover, a load-circuit for the generator-means, and an excitation-system which inherently varies the exciting-voltage of said generator-means so as to make the generator-output vary in response to its speed at a rate faster than the output-variation of the prime-mover, said excitation-system being characterized as follows: said generator-means having a main exciting-winding means for providing its principal excitation, an auxiliary excitation-winding means, an adjustable constant-voltage energizing-means for the auxiliary excitation-winding means of the generator-means, a main dynamo-electric exciter-means mechanically coupled to said prime-mover and electrically connected to energize said main exciting-winding means of the generator-means, said main exciter-means having a self-excited main exciting-winding means for providing its principal excitation, and an auxiliary excitation-means, and one or more dynamo-electric pilot-exciter means mechanically coupled to said prime-mover and electrically connected so as to energize the auxiliary excitation-means of the main exciter-means, said pilot-exciter means having a self-excited exciting-winding means for providing its principal excitation.

2. A power-plant comprising a prime-mover of a type having a power-output which varies approximately as the sixth power of its speed, dynamo-electric generator-means mechanically coupled to said prime-mover and adapted to absorb substantially all of the power of said prime-mover, a load-circuit for the generator-means, and an excitation-system which inherently varies the exciting-voltage of said generator-means so as to make the generator-output vary in response to its speed at a rate faster than the output-variation of the prime-mover, said excitation-system being characterized as follows: said generator-means having a main exciting-winding means for providing its principal excitation, an auxiliary excitation-winding means, an adjustable constant-voltage energizing-means for the auxiliary excitation-winding means of the generator-means, a main dynamo-electric exciter-means mechanically coupled to said prime-mover and electrically connected to energize said main exciting-winding means of the generator-means, said main exciter-means having a self-excited main exciting-winding means for providing its principal excitation, and an auxiliary excitation-means, a first dynamo-electric pilot-exciter means mechanically coupled to said prime-mover and electrically connected to energize the auxiliary excitation-means of the main exciter-means, said first pilot-exciter means having a self-excited main exciting-winding means for providing its principal excitation, and an auxiliary excitation-means, and a second dynamo-electric pilot-exciter means mechanically coupled to said prime-mover and electrically connected to energize the auxiliary excitation-means of the first pilot-exciter means, said second pilot-exciter means having a self-excited exciting-winding means for providing its principal excitation.

3. A power-plant comprising a gas turbine, dynamo-electric generator-means mechanically coupled to the gas turbine and adapted to absorb substantially all of the power of said gas turbine, a load-circuit for the generator-means, and an excitation-system which inherently varies the exciting-voltage of said generator-means so as to make the generator-output vary in response to its speed at a rate faster than the output-variation of the gas turbine, said excitation-system being characterized as follows: said generator-means having a main exciting-winding means for providing its principal excitation, an auxiliary excitation-winding means, an adjustable constant-voltage energizing-means for the auxiliary excitation-winding means of the generator-means, a main dynamo-electric exciter-means mechanically coupled to said gas turbine and electrically connected to energize said main exciting-winding means of the generator-means, said main exciter-means having a self-excited main exciting-winding means for providing its principal excitation, and an auxiliary excitation-means, a first dynamo-electric pilot-exciter means mechanically coupled to said gas turbine and electrically connected to energize the auxiliary excitation-means of the main exciter-means, said first pilot-exciter means having a self-excited main exciting-winding means for providing its principal excitation, and an auxiliary excitation-means, and a second dynamo-electric pilot-exciter means mechanically coupled to said gas turbine and electrically connected to energize the auxiliary excitation-means of the first pilot-exciter means, said second pilot-exciter means having a self-excited exciting-winding means for providing its principal excitation.

4. A plurality of direct-current dynamo-electric machines, a driving means for driving said machines at corresponding speeds which are subject to some variation under different load-conditions, a first one of said machines having a self-excited main exciting-winding means for providing its principal excitation, and an auxiliary excitation-means, and a second one of said machines being electrically connected to energize the auxiliary excitation-means of said first machine, said second machine having a self-excited exciting-winding means for providing its principal excitation.

5. A plurality of direct-current dynamo-electric machines, a driving-means for driving said machines at corresponding speeds which are subject to some variation under different load-conditions, a first one of said machines having a self-excited main exciting-winding means for providing its principal excitation, and an auxiliary excitation-means, a second one of said machines being electrically connected to energize the auxiliary excitation-means of said first machine, said second machine having a self-excited main exciting-winding means for providing its principal excitation, and an auxiliary excitation-means, and a third one of said machines being electrically connected to energize the auxiliary excitation-means of said second machine, said third machine having a self-excited exciting-winding means for providing its principal excitation.

6. In combination, a dynamo-electric generator-means having a main exciting-winding means for providing its principal excitation, and an auxiliary exciting-winding means, a driving-means for driving said generator-means at a speed which is subject to some variation under different load-conditions, a load-circuit for the generator-means, an adjustable constant-voltage energizing-means for the auxiliary excitation-winding means of the generator-means, a main dynamo-electric exciter-means mechanically coupled to said driving-means and electrically connected to energize said main exciting-winding means of the generator-means, said main exciter-means having a self-excited main exciting-winding means for providing its principal excitation, and an auxiliary excitation-means, and one or more dynamo-electric pilot-exciter means mechanically coupled to said driving-means and electrically connected so as to energize the auxiliary excitation-means of the main exciter-means, said pilot-exciter means having a self-excited exciting-winding means for providing its principal excitation.

7. In combination, a dynamo-electric generator-means having a main exciting-winding means for providing its principal excitation, and an auxiliary exciting-winding means, a driving-means for driving said generator-means at a speed which is subject to some variation under different load-conditions, a load-circuit for the generator-means, an adjustable constant-voltage energizing-means for the auxiliary excitation-winding means of the generator-means, a main dynamo-electric exciter-means mechanically coupled to said driving-means and electrically connected to energize said main exciting-winding means of the generator-means, said main exciter-means having a self-excited main exciting-winding means for providing its principal excitation, and an auxiliary excitation-means, a first dynamo-electric pilot-exciter means mechanically coupled to said driving-means and electrically connected to energize the auxiliary excitation-means of the main exciter-means, said first pilot-exciter means having a self-excited main exciting-winding means for providing its principal excitation, and an auxiliary excitation-means, and a second dynamo-electric pilot-exciter means mechanically coupled to said driving-means and electrically connected to energize the auxiliary excitation-means of the first pilot-exciter means, said second pilot-exciter means having a self-excited exciting-winding means for providing its principal excitation.

CLARENCE A. ATWELL.
CHARLES F. JENKINS.

REFERENCES CITED

The following references are of record in the file of this patent:

UNITED STATES PATENTS

| Number | Name | Date |
|---|---|---|
| 1,280,587 | Thury | Oct. 1, 1918 |
| 1,873,982 | Rusterholz | Aug. 30, 1932 |
| 2,193,114 | Seippel | Mar. 12, 1940 |
| 2,203,544 | Pestarini | June 4, 1940 |
| 2,210,675 | Kother | Aug. 6, 1940 |
| 2,263,705 | Seippel | Nov. 25, 1941 |
| 2,290,667 | Aydelott | July 21, 1942 |
| 2,335,784 | Montgomery et al. | Nov. 30, 1943 |
| 2,432,177 | Sedille | Dec. 9, 1947 |